(12) United States Patent
Duan et al.

(10) Patent No.: US 11,524,576 B2
(45) Date of Patent: Dec. 13, 2022

(54) SPEED REDUCTION ASSEMBLY AND A VEHICLE THAT UTILIZES THE SPEED REDUCTION ASSEMBLY

(71) Applicant: GM GLOBAL TECHNOLOGY OPERATIONS LLC, Detroit, MI (US)

(72) Inventors: Chengwu Duan, Shanghai (CN); Mohammad Hotait, Rochester Hills, MI (US); Jian Yao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 483 days.

(21) Appl. No.: 16/707,313

(22) Filed: Dec. 9, 2019

(65) Prior Publication Data

US 2021/0170869 A1    Jun. 10, 2021

(51) Int. Cl.
*B60K 23/04* (2006.01)
*B60L 15/20* (2006.01)
*H02K 11/00* (2016.01)
*H02K 7/116* (2006.01)
*H02K 7/00* (2006.01)

(52) U.S. Cl.
CPC .......... *B60K 23/04* (2013.01); *B60L 15/2036* (2013.01); *H02K 7/006* (2013.01); *H02K 7/1163* (2013.01); *H02K 11/0094* (2013.01)

(58) Field of Classification Search
CPC ... B60K 23/04; B60K 17/165; B60L 15/2036; H02K 7/006; H02K 7/1163; H02K 11/0094
See application file for complete search history.

(56) References Cited

U.S. PATENT DOCUMENTS 3,590,659 A     7/1971  Maroth
6,348,021 B1 *  2/2002  Lemanski ................ F16H 3/70
                                                        475/171

(Continued)

FOREIGN PATENT DOCUMENTS

DE    112011105075 B4    11/2018
DE    102019114828 A1    12/2019
EP       1270995 A1       1/2003

OTHER PUBLICATIONS

Zihni B. Saribay, Robert C. Bill, Design Analysis of Pericyclic Mechanical Transmission System, Mechanism and Machine Theory, available online Nov. 23, 2012, pp. 102-122, 61, Elsevier Ltd.

*Primary Examiner* — Tulsidas C Patel
*Assistant Examiner* — Viswanathan Subramanian
(74) *Attorney, Agent, or Firm* — Quinn IP Law

(57) ABSTRACT

A speed reduction assembly for an electric vehicle includes an electric machine configured to operate as a motor and as a generator. The electric machine includes an output shaft that is rotatable about a longitudinal axis at an output speed. The assembly also includes an output member coupled to the output shaft and rotatable about the longitudinal axis at a reduced speed. In addition, the assembly includes a pericyclic apparatus coupled to the output shaft and the output member to reduce the output speed of the output shaft to the reduced speed of the output member. A vehicle may include the speed reduction assembly in certain configurations. The vehicle includes a battery module and the electric machine is in electrical communication with the battery module to recharge the battery module when the electric machine operates as the generator.

14 Claims, 2 Drawing Sheets

(56) References Cited

U.S. PATENT DOCUMENTS

| | | | |
|---|---|---|---|
| 9,938,004 B2* | 4/2018 | Robuck | B64C 27/14 |
| 10,763,772 B1 | 9/2020 | Fatemi et al. | |
| 10,804,759 B1 | 10/2020 | Lahr et al. | |
| 2015/0045170 A1* | 2/2015 | Ohmura | F16H 48/10 |
| | | | 475/221 |
| 2015/0126320 A1* | 5/2015 | Genise | F16H 61/702 |
| | | | 475/199 |
| 2015/0340927 A1* | 11/2015 | Maiwald | H02K 7/116 |
| | | | 475/149 |
| 2015/0343901 A1* | 12/2015 | Brooks | B60K 17/344 |
| | | | 180/245 |
| 2020/0280241 A1 | 9/2020 | Lahr et al. | |
| 2020/0313475 A1 | 10/2020 | Fatemi et al. | |
| 2020/0321814 A1 | 10/2020 | Fatemi et al. | |
| 2020/0321842 A1 | 10/2020 | Fatemi et al. | |
| 2020/0343803 A1 | 10/2020 | Lahr et al. | |
| 2020/0343846 A1 | 10/2020 | Fatemi et al. | |

* cited by examiner

SPEED REDUCTION ASSEMBLY AND A VEHICLE THAT UTILIZES THE SPEED REDUCTION ASSEMBLY

INTRODUCTION

An electric or hybrid vehicle has been developed that uses one or more electric machines to output torque that ultimately drives wheels of the vehicle. Typically, the electric machine has an output shaft that rotates at a speed, and this speed needs to be reduced to a level suitable to rotate the wheels of the vehicle. One or more planetary gear sets, or one or more intermediate shafts having a multi-gear/stage layout, is used to reduce the rotational speed to the wheels, but requires a large packaging space due to the number of components needed, and the number of components affect the mechanical efficiency as well. For example, the more stages used to reduce the rotational speed to the wheels, the power losses increase.

SUMMARY

The present disclosure provides for a speed reduction assembly for an electric vehicle. The assembly includes an electric machine configured to operate as a motor and as a generator. The electric machine includes an output shaft that is rotatable about a longitudinal axis at an output speed. The assembly also includes an output member coupled to the output shaft and rotatable about the longitudinal axis at a reduced speed. In addition, the assembly includes a pericyclic apparatus coupled to the output shaft and the output member to reduce the output speed of the output shaft to the reduced speed of the output member.

The speed reduction assembly optionally includes one or more of the following:

A) the output member includes a first gear portion disposed about the longitudinal axis;

B) the pericyclic apparatus includes a reaction control member (RCM) having a first gear portion disposed about the longitudinal axis and facing toward the first gear portion of the output member;

C) the pericyclic apparatus includes a pericyclic motion converter (PMC) disposed between the output member and the RCM, and the PMC is disposed about the longitudinal axis;

D) the PMC engages the first gear portion of the output member and the first gear portion of the RCM to rotatably connect the output shaft and the output member;

E) a stationary component, in which the RCM is fixed to the stationary component;

F) the PMC is rotatable about the longitudinal axis relative to the RCM;

G) the RCM, the PMC, and the output member are coaxial along the longitudinal axis;

H) the PMC includes a first gear side that engages the first gear portion of the RCM;

I) the PMC includes a second gear side that opposes the first gear side and engages the first gear portion of the output member;

J) the first gear portion of the RCM, the first and second gear sides of the PMC, and the first gear portion of the output member are coaxial along the longitudinal axis;

K) the first gear portion of the RCM and the first gear portion of the output member are disposed around the longitudinal axis in a substantially perpendicular arrangement;

L) the first and second gear sides of the PMC are disposed around the longitudinal axis and positioned along a central axis transverse to the longitudinal axis such that the PMC is disposed angularly relative to the first gear portion of the RCM and the first gear portion of the output member;

M) a cage fixed to the output shaft such that the cage and the output shaft rotate concurrently at the output speed;

N) the cage surrounds the PMC, at least part of the RCM, and at least part of the output member;

O) the output shaft of the electric machine, the cage, the first gear portion of the RCM, the first and second gear sides of the PMC, and the first gear portion of the output member are coaxial along the longitudinal axis;

P) the RCM includes a second gear portion spaced from the first gear portion;

Q) the PMC is further defined as a first PMC, and the first PMC includes the first gear side and a second gear side opposing the first gear side;

R) the output member includes a second gear portion opposing the first gear portion of the output member;

S) a second PMC spaced from the first PMC, with the first and second gear portions of the output member disposed between the first and second PMCs;

T) the second PMC includes a first gear side that engages the second gear portion of the RCM and a second gear side that engages the second gear portion of the output member;

U) a differential coupled to the output member to transfer torque from the electric machine to the differential, and the differential includes a first drive shaft and a second drive shaft;

V) a plurality of wheels with one of the wheels coupled to the first drive shaft and another one of the wheels coupled to the second drive shaft;

W) the pericyclic apparatus is configured to reduce the output speed of the output shaft to the reduced speed to rotate the first and second drive shafts at the reduced speed to drive the wheels;

X) the pericyclic apparatus, the output member, and the first and second drive shafts are coaxial relative to the longitudinal axis;

Y) the PMC engages the first gear portion of the output member and the first gear portion of the RCM to rotatably connect the output shaft and the output member which transfers the torque from the electric machine to the differential to drive the wheels;

Z) the output shaft of the electric machine, the first gear portion of the output member, the first gear portion of the RCM, the PMC, and the first and second drive shafts are coaxial relative to the longitudinal axis;

AA) an output gear fixed to the output member;

BB) a secondary gear coupled to the differential and the output gear to transfer torque from the electric machine to the wheels;

CC) the output shaft, the pericyclic apparatus, the output member, and the output gear are coaxial along the longitudinal axis;

DD) the first and second drive shafts are rotatable about a first axis, and the secondary gear and the first and second drive shafts are coaxial along the first axis;

EE) the longitudinal axis and the first axis are spaced from each other in a substantially parallel arrangement;

FF) the output speed of the output shaft of the electric machine is equal to or greater than 10,000 revolutions per minute; and GG) the pericyclic apparatus is configured to provide a speed reduction ratio of 13:1 or greater than 13:1.

The present disclosure provides for a vehicle that includes a battery module, and an electric machine configured to operate as a motor and as a generator. The electric machine is in electrical communication with the battery module to recharge the battery module when the electric machine operates as the generator. The electric machine includes an output shaft that is rotatable about a longitudinal axis at an output speed. The vehicle also includes an output member coupled to the output shaft and rotatable about the longitudinal axis at a reduced speed. The vehicle further includes a differential coupled to the output member to transfer torque from the electric machine to the differential when the electric machine operates as the motor. The differential includes a first drive shaft and a second drive shaft. Furthermore, the vehicle includes a plurality of wheels with one of the wheels coupled to the first drive shaft and another one of the wheels coupled to the second drive shaft. In addition, the vehicle includes a pericyclic apparatus coupled to the output shaft and the output member to reduce the output speed of the output shaft to the reduced speed of the output member to rotate the first and second drive shafts at the reduced speed to drive the wheels.

The vehicle optionally includes the pericyclic apparatus, the output member, and the first and second drive shafts are coaxial relative to the longitudinal axis.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
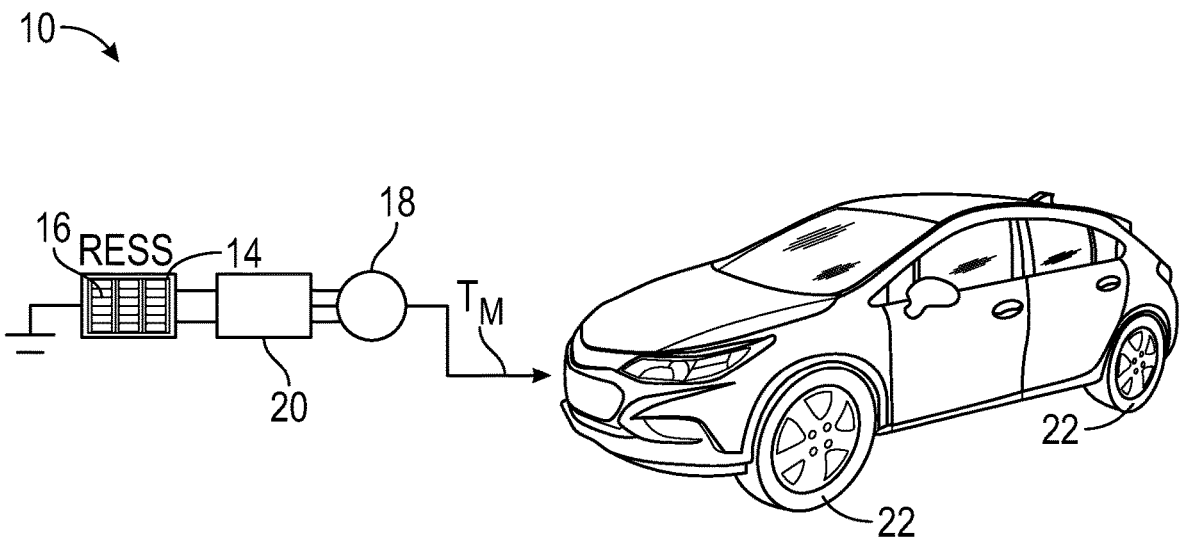
FIG. 1 is a schematic illustration of a vehicle that may implement a speed reduction assembly.

Referring to the FIGS., wherein like numerals indicate like or corresponding parts throughout the several views, a vehicle 10 and a speed reduction assembly 12, which may be utilized in the vehicle 10, are generally shown in FIG. 1.

Non-limiting examples of the vehicle 10 may include a car, a truck, a motorcycle, an off-road vehicle, a farm vehicle, a watercraft, an aircraft, or any other suitable moveable platform. Additionally, the vehicle 10 may be an electric vehicle, such as an all-electric vehicle (which does not use an internal combustion engine) or a hybrid-electric vehicle (which uses an internal combustion engine in combination with one or more electric machines), etc. It is to be appreciated that alternatively, the speed reduction assembly 12 may be a non-vehicle application, such as, farm equipment, stationary platforms, stationary power plants, robots, etc.

Referring to FIG. 1, generally, the vehicle 10 may include one or more of battery module(s) 14, powertrain(s), various electrical components or systems, pump(s), cooling system(s), etc. The vehicle 10 may be powered on in order to operate the vehicle 10 and/or operate various onboard systems of the vehicle 10. For example, the battery module 14 may be configured to provide power to the vehicle 10 when the vehicle 10 is powered on. The vehicle 10 may also be powered off, in which the vehicle 10 is not operable to drive. When the vehicle 10 is off, the battery module 14 may provide power to monitor and/or control various onboard systems.

Further with respect to the construction of the battery modules 14, each of the battery modules 14 includes a plurality of individual battery cells 16, and embodies a relatively high-voltage energy storage device having an application-specific number of such battery cells 16. In some applications, as few as two battery modules 14 may be used in a battery pack or rechargeable energy storage system (RESS), with the actual number being dependent on the required amount of power. As described below with reference to FIG. 1, the RESS includes one or more battery modules 14 each including the plurality of battery cells 16 that are rechargeable. The battery cells 16 may be formed of various materials that are rechargeable, e.g., lithium ion or nickel metal hydride battery cells 16 or any other suitable material of battery cells 16. For instance, 192 or more individual lithium ion battery cells 16 may be used in an example configuration collectively capable of outputting at least 18-60 kWh of power depending on the configuration, with a total voltage capacity of 60-300 volts or more. While a vehicle 10 is shown in FIG. 1 as an example configuration of a use of the speed reduction assembly 12, again, non-vehicle applications may also be envisioned.

As mentioned above, the vehicle 10 may include a powertrain, and for instance, the powertrain may be an electric powertrain as shown, or a hybrid-electric powertrain. The powertrain may include one or more electric machines 18 such as a motor/generator, with the electric machine 18 drawing electrical power from or delivering electrical power to the RESS as needed. The electric machine 18, powered via a power inverter module 20 that is electrically connected to the RESS, may generate torque $T_M$ (arrow $T_M$) which is ultimately transferred to front and/or rear drive wheels 22, respectively. More specifically, the torque $T_M$ is transferred to a differential 24 then out to the wheels 22 through the differential 24 to drive the wheels 22.

In certain configurations, the speed reduction assembly 12 may be for an electric vehicle 10, and in this configuration, the electric machine 18 is configured to operate as a motor and as a generator. The electric machine 18 is in electrical communication with the battery module 14 (to recharge the battery module 14 when the electric machine 18 operates as the generator). Therefore, the electric machine 18 may use power from the battery module 14 to operate the electric machine 18 as a motor, or the electric machine 18 may produce power to recharge the battery module 14 when the electric machine 18 operates as the generator.

Figure 2:
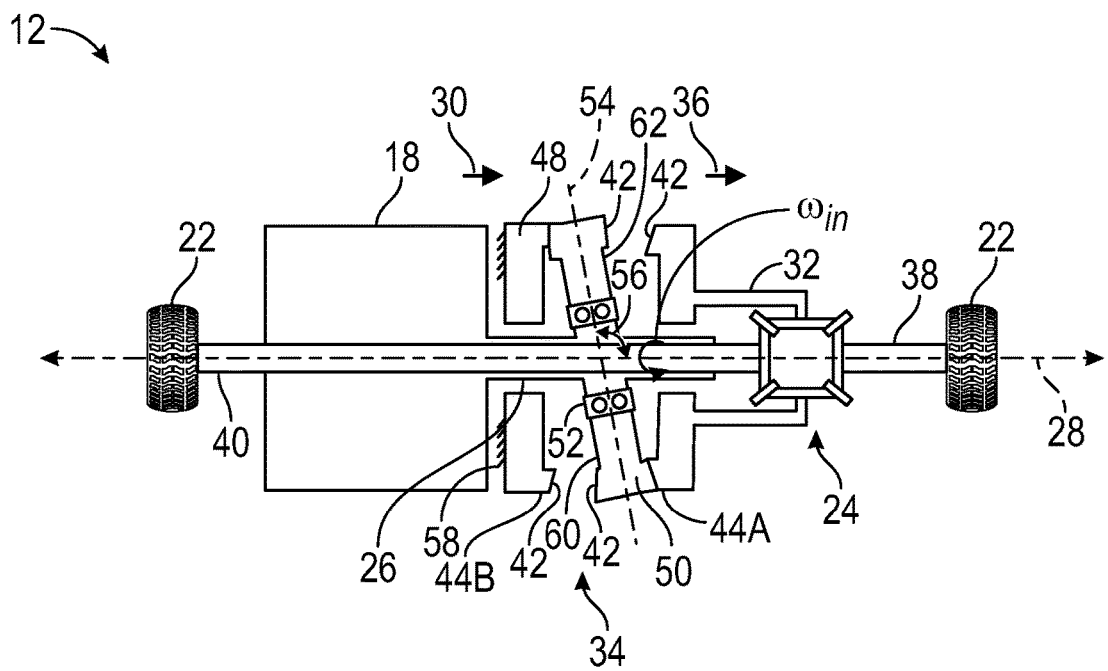
FIG. 2 is a schematic illustration of one configuration of the speed reduction assembly that may be implemented in FIG. 1.
Figure 3:
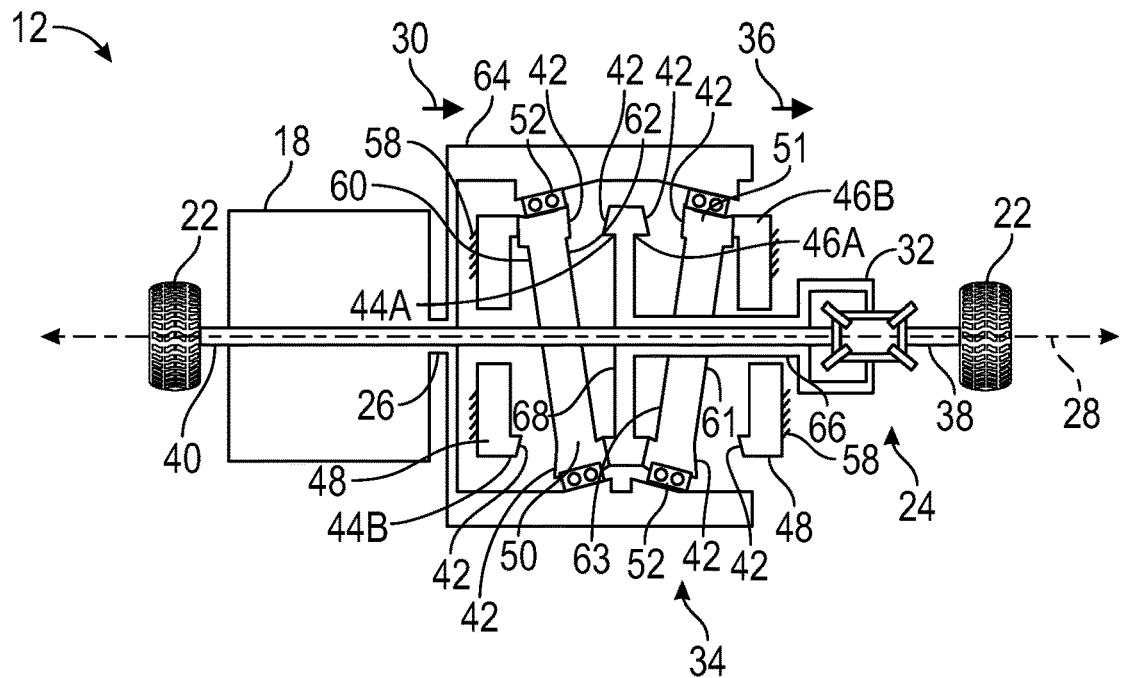
FIG. 3 is a schematic illustration of another configuration of the speed reduction assembly that may be implemented in FIG. 1.
Figure 4:
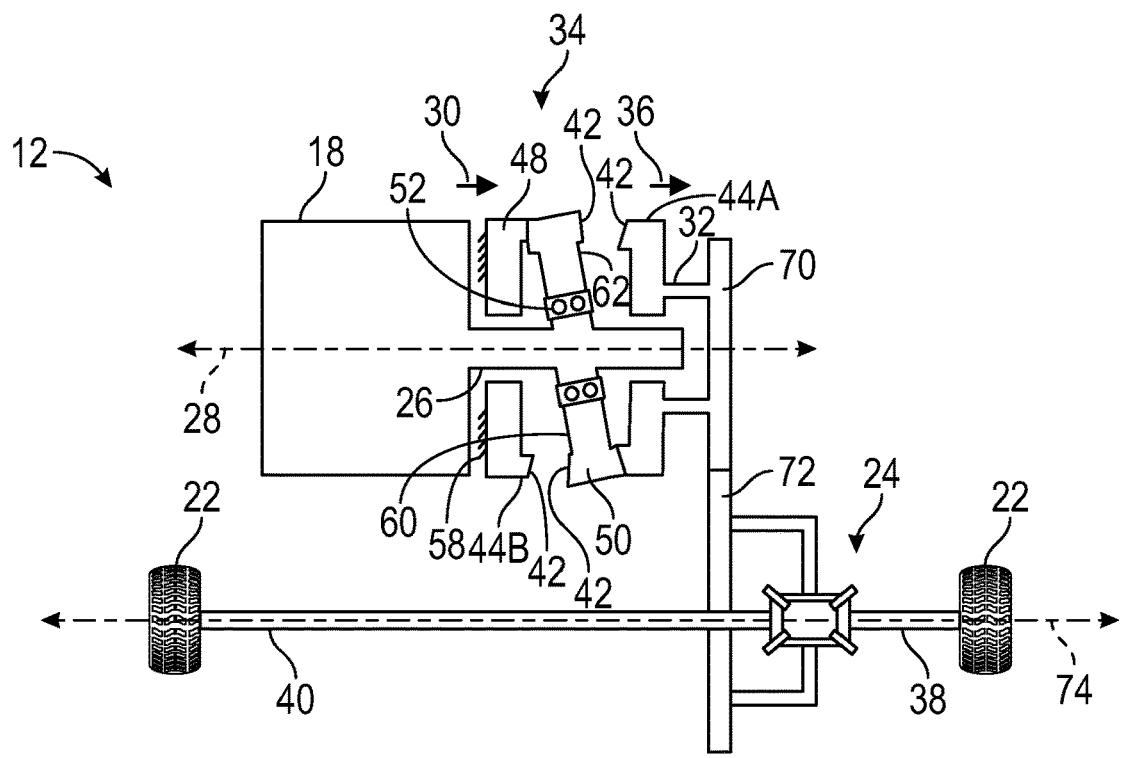
FIG. 4 is a schematic illustration of yet another configuration of the speed reduction assembly that may be implemented in FIG. 1.

Turning to FIGS. 2-4, the electric machine 18 includes an output shaft 26 that is rotatable about a longitudinal axis 28 at an output speed 30 (arrow 30 in FIGS. 2-4). Furthermore, the output shaft 26 transfers the torque $T_M$ from the electric machine 18 when the electric machine 18 operates as the motor. The electric machine 18 operates at a very high speed (such as 10,000 revolutions per minute (rpm) or higher as discussed further below), and this speed needs to be reduced to a suitable speed to drive the wheels 22. As a non-limiting example, the output speed 30 of the output shaft 26 of the electric machine 18 may be equal to or greater than 10,000 rpm. As another example, the output speed 30 of the electric machine 18 may be equal to or greater than 17,000 rpm. As yet another example, the output speed 30 of the output shaft 26 of the electric machine 18 may be equal to or greater than 30,000 rpm.

Therefore, due to the very high speed that the output shaft 26 rotates (10,000 rpm to 30,000 rpm or higher), the speed reduction assembly 12 is implemented to provide a speed reduction that is suitable to drive the wheels 22. For example, a suitable speed to rotate the wheels 22 may be equal to or less than 2,000 rpm. Hence, a high reduction ratio of the speed is provided with the implementation of the speed reduction assembly 12.

Continuing with FIGS. 2-4, the speed reduction assembly 12 includes an output member 32 coupled to the output shaft 26. The output member 32 is spaced from the output shaft 26, and the output member 32 is indirectly coupled to the output shaft 26. The speed reduction assembly 12 also includes a pericyclic apparatus 34 disposed between the output shaft 26 and the output member 32 to provide the desired speed reduction as discussed further below.

The output member 32 is coupled to the wheels 22, and thus, transfers the torque $T_M$ from the electric machine 18, through the output member 32 and out to the wheels 22. Therefore, the output member 32 is rotatable about the longitudinal axis 28 at a reduced speed 36 (arrow 36 in FIGS. 2-4), and the reduced speed 36 may be the desired speed to rotate the wheels 22. For example, the reduced speed 36 that the output member 32 rotates at may be equal to or less than 2,000 rpm.

Continuing with FIGS. 2-4, the speed reduction assembly 12 may include the differential 24 coupled to the output member 32 to transfer the torque $T_M$ from the electric machine 18 to the differential 24 when the electric machine 18 operates as the motor. The differential 24 may include a first drive shaft 38 and a second drive shaft 40 spaced from the first drive shaft 38. One of the wheels 22 is coupled to the first drive shaft 38 and another one of the wheels 22 is coupled to the second drive shaft 40. Therefore, the torque $T_M$ from the electric machine 18 is ultimately transferred to the wheels 22 through the differential 24. Furthermore, the first and second drive shafts 38, 40, and the corresponding wheels 22, are rotatable at the reduced speed 36.

Turning back to the pericyclic apparatus 34, the pericyclic apparatus 34 is configured to provide a high reduction ratio of the speed 36 being delivered to the wheels 22 as compared to the speed 30 being outputted from the electric machine 18. For example, the pericyclic apparatus 34 may be configured to provide a speed reduction ratio of 13:1 or greater than 13:1. As another example, the pericyclic apparatus 34 may be configured to provide a speed reduction ratio of 17:1 or greater than 17:1. As yet another example, the pericyclic apparatus 34 may be configured to provide a speed reduction ratio of 60:1 or greater than 60:1. Different configurations of the pericyclic apparatus 34 may be used as illustrated in FIGS. 2-4, and will be discussed below. The pericyclic apparatus 34 provides a compact and lightweight structure that achieves the desired high reduction ratio when using the electric machine 18 described herein. Also, a high mechanical efficiency may be achieved by using the pericyclic apparatus 34 described herein. Even though not illustrated in the figures, it is to be appreciated that various connections, connectors, bearings, bushings, shafts, may be disposed in and/or between the electric machine 18 and the wheels 22 to transfer rotational movement and the torque $T_M$ therethrough.

Generally, the pericyclic apparatus 34 is coupled to the output shaft 26 and the output member 32 to reduce the output speed 30 of the output shaft 26 to the reduced speed 36 of the output member 32. More specifically, the pericyclic apparatus 34 is configured to reduce the output speed 30 of the output shaft 26 to the reduced speed 36 to rotate the first and second drive shafts 38, 40 at the reduced speed 36 to drive the wheels 22. Therefore, the pericyclic apparatus 34 acts as a transmission that transfers the torque $T_M$ from the electric machine 18 and the reduced speed 36 of the output member 32 to the differential 24 and out to the wheels 22 to drive the wheels 22. It is to be appreciated that the pericyclic apparatus 34 may be referred to as a pericyclic transmission. When referring to the pericyclic apparatus 34 or pericyclic transmission, this generally refers to various components that cooperate to provide the high reduction ratio with a high tooth contact ratio using one or more nutating/rotating components.

Generally, the pericyclic apparatus 34 provides the high reduction ratio via the configuration of the components, which includes the number of teeth 42 provided on the corresponding gear components, as discussed further below. Referring to FIGS. 2-4, the output member 32 may include a first gear portion 44A disposed about the longitudinal axis 28. The first gear portion 44A of the output member 32 may include a plurality of teeth 42 spaced from each other around the longitudinal axis 28. In other configurations, such as FIG. 3, the output member 32 may also include a second gear portion 46A opposing the first gear portion 44A of the output member 32. The second gear portion 46A of the output member 32 may include a plurality of teeth 42 spaced from each other around the longitudinal axis 28.

Again referring to FIGS. 2-4, the pericyclic apparatus 34 may include a reaction control member (RCM) 48 having a first gear portion 44B disposed about the longitudinal axis 28. The first gear portion 44B of the RCM 48 may face toward the first gear portion 44A of the output member 32. The RCM 48 may include a plurality of teeth 42 spaced from each other around the longitudinal axis 28. In certain configurations, the first gear portion 44B of the RCM 48 and the first gear portion 44A of the output member 32 are disposed around the longitudinal axis 28 in a substantially perpendicular arrangement as shown in FIGS. 2-4.

Continuing with FIGS. 2-4, the pericyclic apparatus 34 may include a pericyclic motion converter (PMC) 50 disposed between the output member 32 and the RCM 48. Furthermore, the PMC 50 is disposed about the longitudinal axis 28, and is rotatably about the longitudinal axis 28. The PMC 50 is attached to part of the output shaft 26. Therefore, the output speed 30 is reduced through the PMC 50. One or more bearings 52 may be disposed between the PMC 50 and part of the output shaft 26.

Referring to FIGS. 2-4, the PMC 50 is disposed angularly relative to the longitudinal axis 28. As such, the PMC 50 is positioned along a central axis 54 transverse to the longitudinal axis 28 such that the PMC 50 is disposed angularly relative to the first gear portion 44B of the RCM 48 and the first gear portion 44A of the output member 32. Generally, the central axis 54 is disposed at an angle 56 relative to the longitudinal axis 28 that is not equal to 0 degrees, 90 degrees, or 180 degrees. The PMC 50 is rotatable about the longitudinal axis 28 on the angle 56 relative to the longitudinal axis 28. Therefore, the PMC 50 is one of the nutating/rotating components. The PMC 50 nutates relative to the central axis 54.

Generally, the PMC 50 engages the first gear portion 44A of the output member 32 and the first gear portion 44B of the RCM 48 to rotatably connect the output shaft 26 and the output member 32. More specifically, the PMC 50 engages the first gear portion 44A of the output member 32 and the first gear portion 44B of the RCM 48 to rotatably connect the output shaft 26 and the output member 32 which transfers the torque $T_M$ from the electric machine 18 to the differential 24 to drive the wheels 22.

The speed reduction assembly 12 may further include a stationary component 58, such as a housing, a casing, or any structure that provides a stationary feature. In this configuration, the RCM 48 is fixed to the stationary component 58. Therefore, the RCM 48 is not rotatable about the longitudinal axis 28. Instead, the PMC 50 is rotatable about the longitudinal axis 28 relative to the RCM 48.

Referring to FIGS. 2-4, the pericyclic apparatus 34, the output shaft 26 of the electric machine 18, and the output member 32 are coaxial along the longitudinal axis 28. More specifically, the RCM 48, the PMC 50, and the output member 32 are coaxial along the longitudinal axis 28. In certain configurations, the output shaft 26 of the electric machine 18, the first gear portion 44A of the output member 32, the first gear portion 44B of the RCM 48, the PMC 50, and the first and second drive shafts 38, 40 are coaxial relative to the longitudinal axis 28. A space savings may be achieved by aligning the pericyclic apparatus 34, the output shaft 26, and the output member 32 coaxially, and more specifically, by coaxially aligning the RCM 48, the PMC 50, and the output member 32 along the longitudinal axis 28. Also, a high mechanical efficiency may be achieved by aligning the pericyclic apparatus 34, the output shaft 26, and the output member 32 coaxially along the longitudinal axis 28.

In certain configurations, the pericyclic apparatus 34, the output member 32, and the first and second drive shafts 38, 40 are coaxial relative to the longitudinal axis 28 (see FIGS. 2 and 3). In other configurations, the first and second drive shafts 38, 40 are offset from the longitudinal axis 28 (see FIG. 4), which will be discussed further below.

Turning back to the PMC 50, the PMC 50 engages both of the RCM 48 and the output member 32. Therefore, the PMC 50 may include a first gear side 60 that engages the first gear portion 44B of the RCM 48, and a second gear side 62 that opposes the first gear side 60 and engages the first gear portion 44A of the output member 32. The first and second gear sides 60, 62 of the PMC 50 are disposed around the longitudinal axis 28. The first gear side 60 of the PMC 50 may include a plurality of teeth 42 spaced from each other around the longitudinal axis 28, and additionally, the second gear side 62 of the PMC 50 may include a plurality of teeth 42 spaced from each other around the longitudinal axis 28. Therefore, the teeth 42 of the corresponding components mesh together to transfer the torque $T_M$ from the electric machine 18 to the wheels 22. The first gear portion 44B of the RCM 48, the first and second gear sides 60, 62 of the PMC 50, and the first gear portion 44A of the output member 32 are coaxial along the longitudinal axis 28.

Generally, the number of teeth 42 of the RCM 48, PMC 50, and the output member 32 as well as the angle 56 of the PMC 50 may be used to determine the speed reduction ratio. Other factors may also be used to determine the speed reduction ratio, such as, the angle 56 and/or spacing of the teeth 42 the RCM 48, PMC 50, and the output member 32, the angle 56 of the PMC 50, etc. For illustrative purposes, an example of the speed reduction ratio will be discussed with regarding to FIG. 2, but may be applied to other configurations herein. The speed reduction ratio using the pericyclic apparatus 34 may use equation (1):

$$i_c = \frac{\omega_{in}}{\omega_{out}} = \frac{1}{1 - \frac{N_1}{N_2}\frac{N_3}{N_4}} \tag{1}$$

wherein:
$i_c$=the overall speed reduction ratio;
$\omega_{in}$=the speed 30 of the output shaft 26;
$\omega_{out}$=the speed 36 of the output member 32;
$N_1$=number of teeth of the first gear portion 44B of the RCM 48;
$N_2$=number of teeth of the first gear side 60A of the PMC 50;
$N_3$=number of teeth of the second gear side 62A of the PMC 50; and
$N_4$=number of teeth of the first gear portion 44A of the output member 32.

Turning to FIG. 3, the speed reduction assembly 12 may include additional features to reduce gyroscopic effects due to rotation of the PMC 50. In this configuration, the speed reduction assembly 12 may also include a cage 64 fixed to the output shaft 26 such that the cage 64 and the output shaft 26 rotate concurrently at the output speed 30. The cage 64 surrounds the PMC 50, at least part of the RCM 48, and at least part of the output member 32. In certain configurations, the cage 64 may completely surround the pericyclic apparatus 34. Generally, the output shaft 26 of the electric machine 18, the cage 64, the RCM 48, the PMC 50, and the output member 32 are coaxial along the longitudinal axis 28. More specifically, in certain configurations, the output shaft 26 of the electric machine 18, the cage 64, the first gear portion 44B of the RCM 48, the first and second gear sides 60, 62 of the PMC 50, and the first gear portion 44A of the output member 32 are coaxial along the longitudinal axis 28.

Continuing with FIG. 3, the PMC 50 is further defined as a first PMC 50, and the pericyclic apparatus 34 further includes a second PMC 51 spaced from the first PMC 50. The first and second PMCs 50, 51 are substantially the same configuration but disposed at equal and opposite angles relative to each other to reduce gyroscopic effects during rotation of the first and second PMCs 50, 51. The PMCs 50, 51 are one of the nutating/rotating components, in which the first PMC 50 nutates relative to the central axis 54, and the second PMC 51 nutates relative to an axis that is equal and opposite of the angle of the central axis 54. In this configuration, the bearings 52 are disposed in a different location as compared to FIGS. 2 and 4. Specifically, the bearings 52 are disposed between the cage 64 and ends of the first and second PMCs 50, 51.

Again, continuing with FIG. 3, part of the output member 32 is disposed between the first and second PMCs 50, 51. More specifically, the first and second gear portions 44A, 46A of the output member 32 are disposed between the first and second PMCs 50, 51. Specifically, the output member 32 may include a shaft portion 66 disposed along the longitudinal axis 28 and a disc portion 68 fixed to an end of the shaft portion 66, with the disc portion 68 including the first and second gear portions 44A, 46A. Therefore, the teeth 42 are disposed on the disc portion 68. The disc portion 68 of the output member 32 is disposed between the first and second PMCs 50, 51. The shaft portion 66 of the output member 32 is rotatably attached to the differential 24, and more specifically, rotation of the shaft portion 66 is transferred the first and second drive shafts 38, 40.

Again continuing with FIG. 3, the RCM 48 may include a second gear portion 46B spaced from the first gear portion 44B of the RCM 48. The second gear portion 46B of the RCM 48 may also include a plurality of teeth 42 spaced from each other around the longitudinal axis 28. The first and second PMCs 50, 51 are disposed between the first and second gear portions 44B, 46B of the RCM 48. In other words, the RCM 48 surrounds the first and second PMCs 50, 51. In addition, the first and second gear portions 44B, 46B of the RCM 48 surrounds the disc portion 68 of the output member 32. As discussed above, the RCM 48 is fixed to the stationary component 58, and thus the first and second gear portions 44B, 46B are fixed thereto. Therefore, the first and second gear portions 44B, 46B of the RCM 48 are not rotatable about the longitudinal axis 28. Instead, the first and second PMCs 50, 51 are rotatable about the longitudinal axis 28 relative to the RCM 48.

Continuing with FIG. 3, the first PMC 50 includes the first gear side 60 and a second gear side 62 opposing the first gear side 60. The first gear side 60 of the first PMC 50 engages the first gear portion 44B of the first RCM 48, and the second gear side 62 of the first PMC 50 engages the first gear portion 44A of the output member 32. Furthermore, the second PMC 51 includes a first gear side 61 that engages the second gear portion 46B of the RCM 48 and a second gear side 63 that engages the second gear portion 46A of the output member 32. The first and second gear sides 60, 61, 62, 63 of the first and second PMCs 50, 51 may also include a plurality of teeth 42 spaced from each other around the longitudinal axis 28. The teeth 42 of the corresponding components mesh together to transfer the torque $T_M$ from the electric machine 18 to the wheels 22.

Turning to FIG. 4, in certain configurations, the differential 24 may be disposed offset from the electric machine 18 and the pericyclic apparatus 34. In this configuration, an output gear 70 may be fixed to the output member 32, and a secondary gear 72 may be coupled to the differential 24 and the output gear 70 to transfer torque $T_M$ from the electric machine 18 to the wheels 22. The output gear 70 and the secondary gear 72 may each include teeth 42 to mesh together with each other. The output shaft 26, the pericyclic apparatus 34, the output member 32, and the output gear 70 are coaxial along the longitudinal axis 28 in this configuration. However, the differential 24, the secondary gear 72, and the first and second drive shafts 38, 40 are spaced from the longitudinal axis 28 in this configuration. The first and second drive shafts 38, 40 are rotatable about a first axis 74, and the secondary gear 72 is rotatable about the first axis 74. Therefore, in this configuration, the secondary gear 72 and the first and second drive shafts 38, 40 are coaxial along the first axis 74. Furthermore, in this configuration, the longitudinal axis 28 and the first axis 74 are spaced from each other in a substantially parallel arrangement.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A speed reduction assembly for an electric vehicle; the assembly comprising:
an electric machine configured to operate as a motor and as a generator, and wherein the electric machine includes an output shaft that is rotatable about a longitudinal axis at an output speed, wherein the output speed of the output shaft of the electric machine is equal to or greater than 10,000 revolutions per minute;
an output member coupled to the output shaft and rotatable about the longitudinal axis at a reduced speed;
a pericyclic apparatus coupled to the output shaft and the output member to reduce the output speed of the output shaft to the reduced speed of the output member, wherein the pericyclic apparatus is configured to provide a high reduction ratio of the output speed of the output shaft to the reduced speed of the output member, wherein the high reduction ratio is a speed reduction ratio of 13:1 or greater than 13:1;
wherein the pericyclic apparatus includes a reaction control member (RCM) and a pericyclic motion converter (PMC) disposed between the output member and the RCM, and wherein the RCM, the PMC, and the output member are coaxial along the longitudinal axis; and
a differential coupled to the output member to transfer torque from the electric machine to the differential, and the differential includes a first drive shaft and a second drive shaft coaxial to each other, and wherein the pericyclic apparatus is configured to reduce the output speed of the output shaft to the reduced speed to rotate the first and second drive shafts at the reduced speed.

2. The assembly as set forth in claim 1 wherein:
the output member includes a first gear portion disposed about the longitudinal axis;
the RCM has a first gear portion disposed about the longitudinal axis and facing toward the first gear portion of the output member;
the PMC is disposed about the longitudinal axis; and
the PMC engages the first gear portion of the output member and the first gear portion of the RCM to rotatably connect the output shaft and the output member.

3. The assembly as set forth in claim 2:
further including a stationary component, and the RCM is fixed to the stationary component; and
wherein the PMC is rotatable about the longitudinal axis relative to the RCM.

4. The assembly as set forth in claim 2 wherein:
the PMC includes a first gear side that engages the first gear portion of the RCM; and
the PMC includes a second gear side that opposes the first gear side and engages the first gear portion of the output member.

5. The assembly as set forth in claim 4 wherein the first gear portion of the RCM, the first and second gear sides of the PMC, and the first gear portion of the output member are coaxial along the longitudinal axis.

6. The assembly as set forth in claim 5 wherein:
the first gear portion of the RCM and the first gear portion of the output member are disposed around the longitudinal axis and face each other in a spaced apart orientation; and
the first and second gear sides of the PMC are disposed around the longitudinal axis and positioned along a central axis transverse to the longitudinal axis such that the PMC is disposed angularly relative to the first gear portion of the RCM and the first gear portion of the output member.

7. The assembly as set forth in claim 4:
further including a cage fixed to the output shaft such that the cage and the output shaft rotate concurrently at the output speed;
wherein the cage surrounds the PMC, at least part of the RCM, and at least part of the output member; and
wherein the output shaft of the electric machine, the cage, the first gear portion of the RCM, the first and second gear sides of the PMC, and the first gear portion of the output member are coaxial along the longitudinal axis.

8. The assembly as set forth in claim 7:
wherein the RCM includes a second gear portion spaced from the first gear portion;
wherein the PMC is further defined as a first PMC, and the first PMC includes the first gear side and a second gear side opposing the first gear side;
wherein the output member includes a second gear portion opposing the first gear portion of the output member;
further including a second PMC spaced from the first PMC, with the first and second gear portions of the output member disposed between the first and second PMCs; and
wherein the second PMC includes a first gear side that engages the second gear portion of the RCM and a second gear side that engages the second gear portion of the output member.

9. The assembly as set forth in claim 1:
further including a plurality of wheels with one of the wheels coupled to the first drive shaft and another one of the wheels coupled to the second drive shaft; and
wherein the pericyclic apparatus is configured to reduce the output speed of the output shaft to the reduced speed to rotate the first and second drive shafts at the reduced speed to drive the wheels.

10. The assembly as set forth in claim 9 wherein the pericyclic apparatus, the output member, and the first and second drive shafts are coaxial relative to the longitudinal axis.

11. The assembly as set forth in claim 10:
the output member includes a first gear portion disposed about the longitudinal axis;
the RCM has a first gear portion disposed about the longitudinal axis and facing toward the first gear portion of the output member;
the PMC is disposed about the longitudinal axis;
the PMC engages the first gear portion of the output member and the first gear portion of the RCM to rotatably connect the output shaft and the output member which transfers the torque from the electric machine to the differential to drive the wheels; and
the output shaft of the electric machine, the first gear portion of the output member, the first gear portion of the RCM, the PMC, and the first and second drive shafts are coaxial relative to the longitudinal axis.

12. The assembly as set forth in claim 10 further including:
an output gear fixed to the output member; and
a secondary gear coupled to the differential and the output gear to transfer torque from the electric machine to the wheels.

13. The assembly as set forth in claim 12 wherein:
the output shaft, the pericyclic apparatus, the output member, and the output gear are coaxial along the longitudinal axis;
the first and second drive shafts are rotatable about a first axis, and the secondary gear and the first and second drive shafts are coaxial along the first axis; and
the longitudinal axis and the first axis are spaced from each other in a substantially parallel arrangement.

14. A vehicle comprising:
a battery module;
an electric machine configured to operate as a motor and as a generator, and the electric machine is in electrical communication with the battery module to recharge the battery module when the electric machine operates as the generator;
wherein the electric machine includes an output shaft that is rotatable about a longitudinal axis at an output speed, wherein the output speed of the output shaft of the electric machine is equal to or greater than 10,000 revolutions per minute;
an output member coupled to the output shaft and rotatable about the longitudinal axis at a reduced speed;
a differential coupled to the output member to transfer torque from the electric machine to the differential when the electric machine operates as the motor, and the differential includes a first drive shaft and a second drive shaft;
a plurality of wheels with one of the wheels coupled to the first drive shaft and another one of the wheels coupled to the second drive shaft;
a pericyclic apparatus coupled to the output shaft and the output member to reduce the output speed of the output shaft to the reduced speed of the output member to rotate the first and second drive shafts at the reduced speed to drive the wheels; and
wherein the pericyclic apparatus, the output member, and the first and second drive shafts are coaxial relative to the longitudinal axis.

* * * * *